United States Patent

Szabo

(10) Patent No.: US 9,897,200 B2
(45) Date of Patent: Feb. 20, 2018

(54) OPTIMIZATION OF SWITCHING OPERATIONS

(71) Applicant: ZF Friedrichshafen AG, Friedrichschafen (DE)

(72) Inventor: Tomas Szabo, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/223,000

(22) Filed: Jul. 29, 2016

(65) Prior Publication Data

US 2017/0030460 A1 Feb. 2, 2017

(30) Foreign Application Priority Data

Jul. 30, 2015 (DE) .................. 10 2015 214 548

(51) Int. Cl.
 *F16H 61/04* (2006.01)
 *F16H 59/38* (2006.01)
 *F16H 61/00* (2006.01)

(52) U.S. Cl.
 CPC ......... *F16H 61/0403* (2013.01); *F16H 59/38* (2013.01); *F16H 2061/0087* (2013.01)

(58) Field of Classification Search
 None
 See application file for complete search history.

(56) References Cited

U.S. PATENT DOCUMENTS

| 2010/0078288 A1* | 4/2010 | Heinrich | F16D 27/115 192/220 |
| 2011/0146433 A1* | 6/2011 | Perosky | F16D 23/06 74/339 |
| 2013/0190134 A1* | 7/2013 | Mair | F16H 61/688 477/86 |

FOREIGN PATENT DOCUMENTS

DE  100 51 537 A1  4/2002

* cited by examiner

*Primary Examiner* — Edwin A Young
(74) *Attorney, Agent, or Firm* — Davis & Bujold, PLLC; Michael J. Bujold

(57) ABSTRACT

A method of optimizing shifting of a shifting element which fixes a shaft to another component of the drive-train. Three shifting processes are influenced by respective characteristic forms of a control parameter. The first and second characteristic forms are different from one another. Each shifting process has a distinct start and end time ($t_{Beginn}$, $t_{Ende}$). The rotational speed of the shaft is a function $n(t)$ of time t. An idealized rotational speed $n_{ideal}(t):=G\{n(t)\}$ is determined by a filter G. First and second evaluation indexes $I:=I(t-\Delta_t,t)/I$ ($t_{Beginn}-_t$, $t_{Beginn}$) are calculated, in which $t_{Beginn} < t \leq t_{Ende}$. $I(t_a, t_b)$ is a measure of a deviation of the rotational speed $n(t)$ from the idealized rotational speed $n_{ideal}(t)$ over time $[t_a, t_b]$. The third characteristic form is chosen based on the first and second evaluation indexes I.

11 Claims, 3 Drawing Sheets

OPTIMIZATION OF SWITCHING OPERATIONS

This application claims priority from German patent application serial no, 10 2015 214 548.4 filed Jul. 30, 2015.

FIELD OF THE INVENTION

The invention concerns a method for optimizing shifting processes of a shifting element.

BACKGROUND OF THE INVENTION

Such methods are used for example in automated transmissions. Such transmissions usually comprise hydraulically actuated disk clutches. When a gearshift is carried out, two or sometimes four clutches are involved. During a gearshift, a first clutch is closed and a second clutch is opened. During this, the first clutch takes over the transmission of torque from the second clutch.

In the case of hydraulically actuated clutches the quality of a shifting operation depends in large measure on the most exact possible pre-filling of the clutch to be closed, with hydraulic fluid. During the use of an automated powershift transmission the coordination of the corresponding filling times takes up not inconsiderable time.

The optimum filling times can vary from one transmission to another, among other things because of manufacturing tolerances. Against that background the document DE 100 51 537 A1 proposes a method for the automatic determination of filling parameters. In this case, while at rest a basic application principle is determined for each clutch.

However, during the life of a transmission the optimum filling times change, for example due to settling of the clutch disks, wear of the clutch linings and sometimes other aging and wear-related changes. Such effects are not taken into account in a basic application principle determined at the beginning of the transmission's life. Furthermore, in automated teach-in routines in most cases an application principle is only learned at a particular operating point, which is then extrapolated with the help of offsets and performance characteristics for the remainder of the working range.

SUMMARY OF THE INVENTION

The purpose of the present invention is to optimize the shifting processes of a shifting element while circumventing the disadvantages inherent in the systems known from the prior art. In particular, during the life of a transmission, deterioration of the shifting processes caused for example by wear or settling effects should be avoided.

The invention is based on the idea of installing, instead of teach-in routines, a running-time adaptation that can be carried out continuously. By means of a running-time adaptation the shifting behavior can be optimized during the operation of a transmission without relying on the results of test cycles. For that purpose parameters by which the shift quality can be influenced are continuously optimized. For this, special evaluation magnitudes serve as a measure for the quality of the shifting processes. The transmission is put in a position, by self-teaching, to avoid shifting processes that have been assessed as being poor, and to reproduce shifting processes that have been assessed as being good.

In a method according to the invention for optimizing shifting processes of a shifting element, the shifting element is designed to connect a shaft of a drive-train in a rotationally fixed manner to another component of the drive-train.

The shaft can in particular be a transmission shaft which is in the torque flow of the transmission, therefore participating in the transfer of torque form an input shaft of a transmission to an output shaft. Depending on the design of the shifting element, the other component of the drive-train can be another shaft or a fixed component such as a transmission housing.

In particular the shifting element can be in the form of a clutch or brake. If a clutch, the shifting element connects the shaft in a rotationally fixed manner to another shaft. If a brake, the shifting element connects the shaft to a transmission housing in a rotationally fixed manner.

In particular, the shifting element is designed to be shiftable. This means that the shifting element can adopt two conditions, an open and a closed condition. In the closed condition the rotationally fixed connection is formed. If the shifting element is in the open condition, the shaft can rotate relative to the other component. The shifting element can optionally be shifted during the operation of the transmission, i.e. changed from the open to the closed condition or from the closed to the open condition.

When in its closed condition, the shifting element is designed to transmit torque between the shaft and the other component of the drive-train. Correspondingly, no torque can be transmitted when the shifting element is in its open condition.

Typically, the shaft rotates at a rotational speed that varies as a function of time t. The invention envisages a function $n(t)$ which correspondingly describes the rotational speed of the shaft as a function of time t. Preferably, a rotational speed sensor serves to determine values of the function $n(t)$.

The function $n(t)$ does not have to be exactly the same as the actual rotational speed of the shaft. For example, owing to measurement inaccuracies there may be deviations between the function $n(t)$ and the actual rotational speed. It is also possible to choose the function $n(t)$ such that only a clear relation between the function $n(t)$ and the actual rotational speed exists. For example, the function $n(t)$ can be proportional to the actual rotational speed, with a proportionality constant different from 1.

The sequence of shifting processes of the shifting element can be influenced by the characteristic form of a control parameter. For example, a first shifting process is influenced by a first characteristic form of the control parameter, a second shifting process by a second characteristic form of the control parameter, and a third shifting process by a third characteristic form of the control parameter.

A shifting process is understood in all cases to mean a change of the shifting element from the open condition to the closed condition or from the closed condition to the open condition. The first shifting process, the second shifting process and the third shifting process are in each case preferably a change of the shifting element from the open to the closed condition.

The first characteristic form and the second characteristic form of the control parameter are different from one another. The first shifting process is initiated at a time $t_{1,Beginn}$ and is completed at a time $t_{1,Ende}$; the second shifting process is initiated at a time $t_{2,Beginn}$ and is completed at a time $t_{2,Ende}$. Thus, the first shifting process takes place during a time interval extending from time $t_{1,Beginn}$ to time $t_{1,Ende}$ and the second shifting process during a time interval extending from time $t_{2,Beginn}$ to time $t_{2,Ende}$, where $t_{1,Beginn} < t_{1,ENDE}$ and $t_{2,Beginn} < t_{2,ENde}$. In particular, the shifting process can follow the first shifting process in time, and in that case: $t_{1,Ende} < t_{2,Beginn}$.

First, the first characteristic form of the control parameter is determined. This can be done either in accordance with the method according to the invention on the basis of previous shifting processes, or by means of teach-in routines known from the prior art. Then the second characteristic form of the control parameter is determined in such manner that it differs from the first characteristic form. Preferably, the second characteristic form is obtained by varying the value of the first characteristic form.

According to the invention, an idealized rotational speed $n_{ideal}(t)$ is calculated. This is a hypothetical variation of the rotational speed of the shaft during an ideal shifting process. By comparing the idealized rotational speed $n_{ideal}(t)$ with the actual rotational speed $n(t)$, the influence of a shifting process on the rotational speed and hence the quality of the shifting process can be assessed.

The idealized rotational speed $n_{ideal}(t)$ is determined by applying a smoothing function G, i.e. the idealized rotational speed $n_{ideal}(t)$ is obtained by smoothing the rotational speed function $n(t)$. Thus, influences of shifting processes on the rotational speed of the shaft are eliminated by smoothing.

As a measure of the deviation of the first shifting process and the second shifting process from the hypothetical ideal, a first evaluation index $$I_1:=I(t-\Delta_p t)/I(t_{1,Beginn}-\Delta_p t_{1,Beginn}),$$

in which $t_{1,Beginn} \leq t \leq t_{1,Ende}$ and a second evaluation index $$I_2:=I(t=\Delta_p t)/I(t_{2,beginn}-\Delta_p t_{2\ Beginn}),$$

in which $t_{2,Beginn} \leq t \leq t_{2\ Ende}$ are calculated. In this case, $I(t_a, t_b)$ is a measure for a deviation of the rotational speed $n(t)$ from the idealized rotational speed $n_{ideal}(t)$ over a time interval $[t_a, t_b]$. Thus, $I(t_a,t_b)$ is a measure of the deviation between $\{(t,n(t))|t_a \leq t \leq t_b\}$ and $\{t,n_{ideal}(t))|t_a \leq t \leq t_b\}$ Preferably, $I(t_a,t_b) \geq 0$.

By virtue of the first evaluation index and the second evaluation index, respectively, the deviation of the rotational speed from the idealized rotational speed during the first shifting process and the second shifting process, in each case during a given time interval, is set as a ratio to the deviation of the rotational speed from the idealized rotational speed during a time interval of the same length before the first shifting process and the second shifting process, respectively.

The measure I for the deviation before the shifting processes characterizes the rotational speed variation without the perturbing influence of a shifting process. In contrast, the corresponding deviation I during the shifting process indicates the extent to which the shifting process concerned has a perturbing effect on the rotational speed variation. Thus a shifting process is the better, the less its evaluation index deviates from 1.

With reference to the first evaluation index and the second evaluation index, it is possible to reach conclusions about a connection between the characteristic form of the control parameter and the quality of the shifting processes of the shifting element Correspondingly, the third characteristic form of the control parameter is chosen as a function of the first evaluation index and the second evaluation index.

In a preferred further development, the first characteristic form of the control parameter is adopted as the third characteristic form when $I_1 < I_2$. Correspondingly, the second characteristic form of the control parameter is adopted as the third characteristic form when $I_2 < I_1$.

In a further preferred further development, the shifting element can be actuated hydraulically. Hydraulic shifting elements are characterized by a so-termed rapid filling time. To actuate the shifting element, a hydraulic pressure, variable over time, is applied to the shifting element. The rapid filling time denotes a time interval at the beginning of a shifting process, in which the hydraulic pressure adopts a first constant value and a second, also constant value. The first value is higher than the second value. After the rapid filling time, the hydraulic pressure usually increases steadily starting from the second value.

The described variation of the hydraulic pressure during the rapid filling time is due to the fact that at the beginning of the shifting process a clutch space has to be filled with hydraulic medium and friction elements of the shifting element have to be brought in contact with one another. The rapid filling time is a hypothetical assumption about the duration of this process. In an ideal case the rapid filling time and the duration of the process described are the same.

According to a further development the rapid filling time is the control parameter. Thus, the method according to this further development varies the rapid filling time and, with reference to the first evaluation index and the second evaluation index, checks the effects upon the shift quality. The more closely the rapid filling time matches the time required to fill the clutch space with hydraulic medium and to bring the frictional elements into contact, the smaller is the expected deviation of the evaluation index from the value 1. Thus, the method optimizes the rapid filling time in such manner that it matches as exactly as possible the time required to fill the clutch space with hydraulic medium and to bring the frictional elements into mutual contact.

In another preferred further development, the smoothing function G is a frequency filter. A frequency filter is a function which, when applied to a first function, gives a second function. If the first function is a frequency spectrum, the same is true of the second function. The frequency spectrum of the second function contains only frequencies which are also contained in the frequency spectrum of the first function. However, at least one frequency in the frequency spectrum of the first function is not contained in the frequency spectrum of the second function, The purpose of the frequency filter is to filter out of the rotational speed signal $n(t)$ any perturbing frequencies that affect the drive-train during a shifting process. Correspondingly, the smoothing function G is preferably further developed in such manner that by virtue of the use of the smoothing function G at least one natural frequency of the drive-train is filtered. Preferably, all the natural frequencies of the drive-train are filtered. Thus, if the rotational speed signal $n(t)$ is a frequency spectrum which contains the natural frequencies of the drive-train, then from this by applying the function G a frequency spectrum is obtained in which at least one and preferably all the natural frequencies of the drive-train are absent.

The frequency filter that serves as the smoothing function G is obtained for example by applying a Fast-Fourier Transformation, subsequently deleting all frequencies above a threshold, for example a threshold of 3 Hz, out of the frequency spectrum, and back-calculating the signal. Another possibility is to use a low-pass filter with a cut-off frequency, for example a cut-off frequency of 3 Hz. To avoid the problem of phase lag, a so-termed zero-phase or null-phase low-pass filter is used. This is calculated on a ring memory forward and then backward, whereby a phase shift of the filtered signal is eliminated. The zero-phase low-pass filter enables an exact determination in time of the occurrence of a momentary impulse accompanied by the excitation of an oscillation during a shifting process. From this, conclusions can be drawn about the filling condition of the shifting element at the beginning of the shifting process. In particular, it can be determined whether the shifting element has been under-filled or over-filled.

In a preferred further development the measure $I(t_a, t_b)$ for the deviation of the rotational speed $n(t)$ from the idealized rotational speed $n_{ideal}(t)$ depends on the sum of the quantitative areas between the rotational speed $n(t)$ and the idealized rotational speed $n_{ideal}(t)$, i.e. on $\int_{t_a}^{t_b}|n(t)-n_{ideal}(t)|dt$. In particular, the relationship $$I(t_a,t_b)=\int_{t_a}^{t_b}|n(t)-n_{ideal}(t)|dt$$

can apply. Alternatively or in addition, the deviation amount $I(t_a, t_b)$ can be calculated as a function of the number Z of zero-points of the difference between the rotational speed $n(t)$ and the idealized rotational speed $n_{ideal}(t)$ during the time interval $[t_a, t_b]$. In particular, the relationship $$I(t_a,t_b)=\int_{t_a}^{t_b}|n(t)-n_{idea}(t)|dt \times Z$$

can apply.

Furthermore, it is particularly helpful in evaluating the shift to calculate the amount $I(t_a, t_b)$ as a function of the first and/or second derivative with reference to time of the differential signal $n(t)-n_{ideal}(t)$.

BRIEF DESCRIPTION OF THE DRAWINGS

Preferred example embodiments of the invention are illustrated in the figures. In detail, the figures show.

DETAILED DESCRIPTION OF THE PREFERRED EMBODIMENTS

Figure 1:
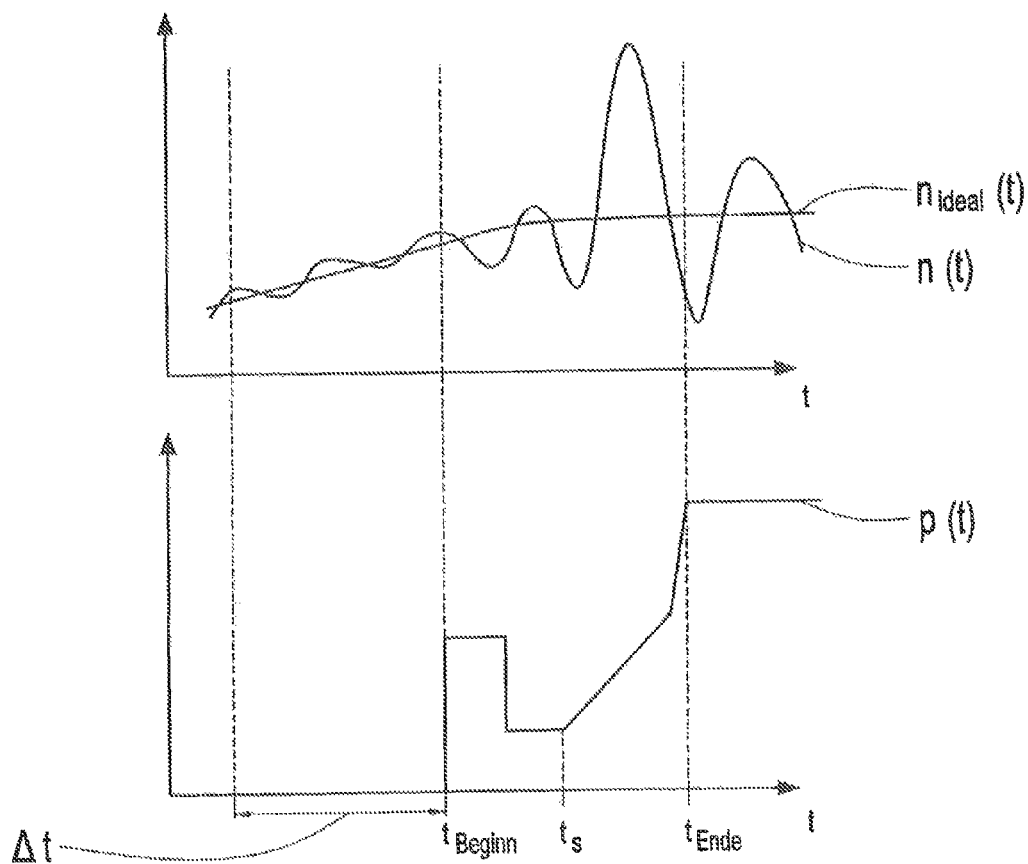
FIG. 1: A pressure and rotational speed variation during the shifting process.

FIG. 1 shows the variation of a clutch pressure $p(t)$, the rotational speed $n(t)$ of a shaft and an idealized rotational speed $n_{ideal}(t)$ as a function of time t. A shifting process begins at time $t_{Beginn}$ and is completed at time $t_{Ende}$. A rapid filling time extends from a time $t_{Beginn}$ to a time $t_{Ende}$.

It should be recognized that the variation of the rotational speed $n(t)$ is already affected by oscillations before the time $t_{Beginn}$. Between the time $t_{Beginn}$ and the second time $t_{Ende}$ additional oscillations are induced by the shifting process. In contrast, in the signal $n_{ideal}(t)$ all the oscillations are filtered.

An evaluation index is first calculated for the time interval $\Delta_t$ before the time $t_{Beginn}$. The drive-train oscillations taking place already before the shifting process play a part in the calculation of this evaluation index.

Figure 2:
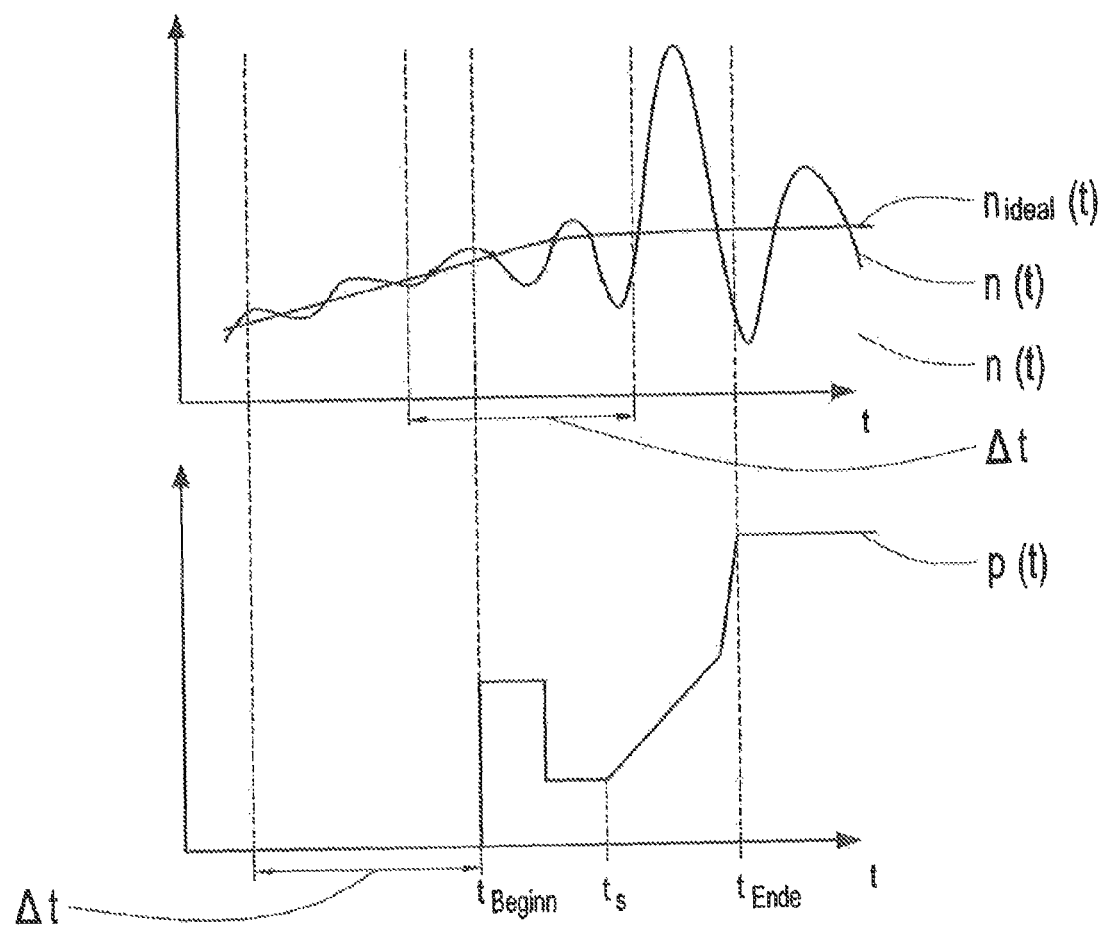
FIG. 2: The calculation of an area-based and zero-point-based index.

At a further time, illustrated as an example in FIG. 2, which is between $t_{Beginn}$ and $t_{Ende}$, an evaluation index for the previous time interval $\Delta_t$ is calculated. Both the area between the graph of $n(t)$ and the graph of $n_{ideal}(t)$ and the number of points of intersection of the two graphs in the interval $\Delta_t$ play a part in the calculation of the evaluation index.

Figure 3:
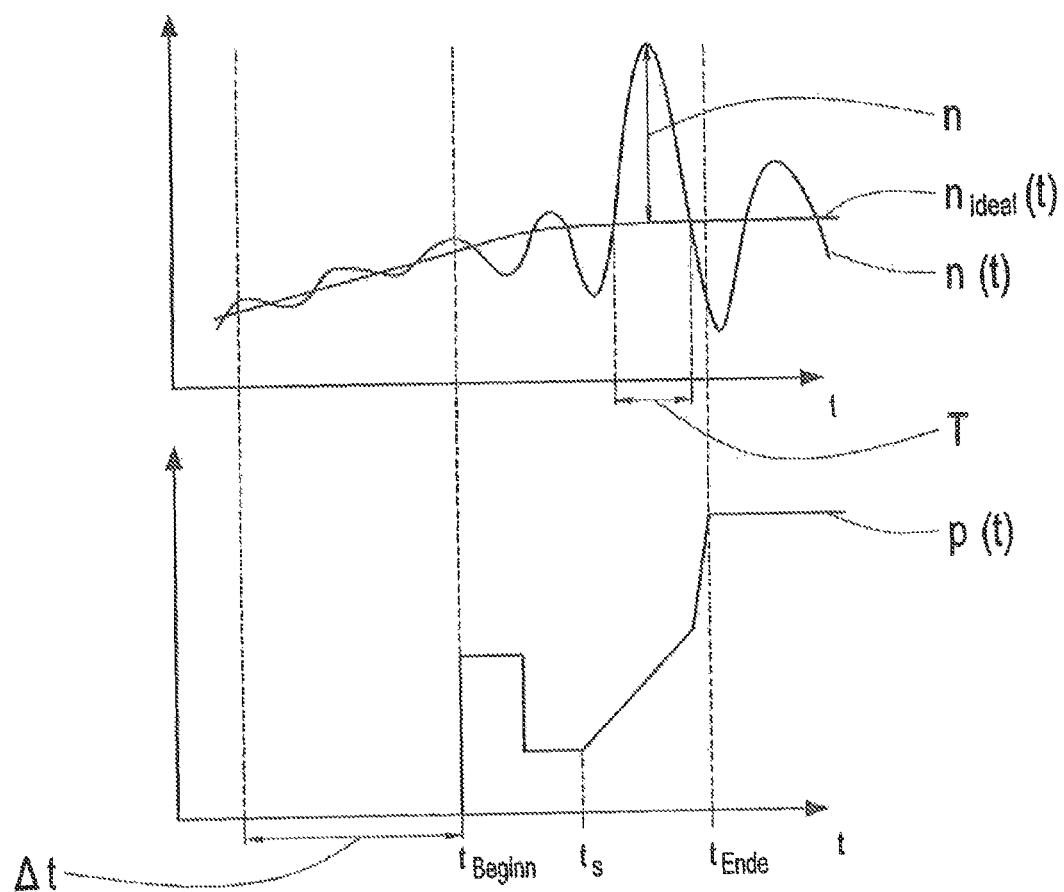
FIG. 3: The calculation of an evaluation index by means of oscillation amplitude and oscillation duration.

FIG. 3 shows the calculation of a further evaluation index as the quotient of the amplitude n̂ of the difference function $n(t)-n_{ideal}(t)$ and the oscillation duration T. Instead of the amplitude n̂ the area enclosed by the graphs can also be used for calculating the quotient.

The invention claimed is:

1. A method of optimizing shifting processes of a shifting element, the shifting element is designed to connect a shaft of a drive-train with another component of the drive-train in a rotationally fixed manner, a first shifting process is influenced by a first manifestation of a control parameter, a second shifting process is influenced by a second manifestation of the control parameter and a third shifting process is influenced by a third manifestation of the control parameter;

the first manifestation and the second manifestation of the control parameter are different from one another;

the first shifting process is initiated at a first begin time $t_{1, Beginn}$ and is completed at a first end time $t_{1, Ende}$;

the second shifting process is initiated at a second begin time $t_{2, Beginn}$ and is completed at a second end time $t_{2, Ende}$; and a rotational speed function $n(t)$ describes a rotational speed of the shaft as a function of time t; and the method comprising:

determining an idealized rotational speed $n_{ideal}(t):=G\{n(t)\}$ by applying a smoothing function (G) to the rotational speed;

calculating a first evaluation index $I_1=I(t-\Delta_t, t)/I(t_{1, Beginn}-\Delta_t, t_{1, Beginn})$, in which:

$t_{1, Beginn} < t \leq t_{1, Ende}$;

calculating a second evaluation index $I_2:=I(t-\Delta_t, t)/I(t_{2, Beginn}-\Delta_t, t_{2, Beginn})$, in which:

$t_{2, Beginn} < t \leq t_{2, Ende}$;

defining a rotational speed deviation $I(t_a, t_b)$ as a measure of a deviation of the rotational speed $n(t)$ from the idealized rotational speed $n_{ideal}(t)$ over a time interval $[t_a, t_b]$; and selecting the third manifestation of the control parameter as a function of the first evaluation index $I_1$ and the second evaluation index $I_2$.

2. The method according to claim 1, further comprising:

selecting the third manifestation of the control parameter such that third manifestation corresponds to the first manifestation, if the first evaluation index $I_1$<the second evaluation index $I_2$; and selecting the third manifestation of the control parameter such that the third manifestation corresponds to the second manifestation, if the second evaluation index $I_2$<the first evaluation index $I_1$.

3. The method according to claim 1, further comprising:

actuating the shifting element hydraulically; and defining the control parameter as a rapid filling time.

4. The method according to claim 1, further comprising: defining the smoothing function (G) as a frequency filter.

5. The method according to claim 1, further comprising applying the smoothing function (G) to the rotational speed to filter at least one natural frequency of the drive-train.

6. The method according to claim 1, further comprising calculating the rotational speed deviation:

$I(t_a, t_b)$ as a function of $\int_{t_a}^{t_b}|n(t)-n_{ideal}(t)|dt$.

7. The method according to claim 6, wherein the following relationship applies to the rotational speed deviation:

$$I(t_a,t_b)=\int_{t_a}^{t_b}|n(t)-n_{ideal}(t)|dt \times Z.$$

8. The method according to claim 1, wherein the following relationship applies to the rotational speed deviation:

$$I(t_a,t_b)=\int_{t_a}^{t_b}|n(t)-n_{ideal}(t)|dt.$$

9. The method according to claim 1, further comprising calculating the rotational speed deviation $I(t_a,t_b)$ as a function of a number Z of zero-points of $n(t)-n_{ideal}(t)$ during the time interval $([t_a, t_b])$.

10. The method according to claim 1, further comprising calculating the rotational speed deviation
$I(t_a, t_b)$ as a function of at least one of a first derivative and a second derivative of a differential of the rotational seed and the idealized rotational speed over time.

11. A method of optimizing shifting processes of a shifting element, the shifting element connects a shaft of a drive-train with another component of the drive-train in a rotationally fixed manner, a first shifting process is influenced by a first manifestation of a control parameter, a second shifting process is influenced by a second manifestation of the control parameter and a third shifting process is influenced by a third manifestation of the control parameter, the method comprising:

defining the first manifestation of the control parameter as being different than the second manifestation of the control parameter;

initiating the first shifting process at a first time point $t_{1,\,Beginn}$ and completing the first shifting process at a second time point $t_{1,\,Ende}$;

initiating the second shifting process at a third time point $t_{1,Beginn}$ and completing the second shifting process at a fourth time point $t_{1,\,Ende}$;

defining a rotational speed of the shaft as a function $n(t)$ of time t;

determining an idealized rotational speed of the shaft $n_{ideal}(t):=G\{n(t)\}$ by applying a smoothing function G to the rotational seed;

calculating a first evaluation index: $I_1=I(t-\Delta_t,t)/I(t_{1,\,Beginn}-\Delta_t,t_{1,\,Beginn})$, in which:

$t_{1,\,Beginn} < t \leq t_{1,\,Ende}$;

calculating a second evaluation index $I_2:=I(t-\Delta_t,t)/I(t_{2,\,Beginn}-\Delta_t,t_{2,\,Beginn})$, in which:

$t_{2,\,Beginn} < t \leq t_{2,\,Ende}$;

defining a rotational speed variation $I(t_a, t_b)$ as a measure of a deviation of the rotational speed of the shaft $n(t)$ from the idealized rotational speed of the shaft $n_{ideal}(t)$ over a time interval $[t_a,t_b]$; and selecting the third manifestation of the control parameter as a function of the first evaluation index $I_1$ and the second evaluation index.

* * * * *